W. L. DEMPSEY.
FIFTH WHEEL COUPLING FOR WAGONS.
APPLICATION FILED NOV. 3, 1915.

1,235,962.

Patented Aug. 7, 1917.
2 SHEETS—SHEET 1.

Inventor.
William L. Dempsey
by Heard Smith & Tennant
Attys

W. L. DEMPSEY.
FIFTH WHEEL COUPLING FOR WAGONS.
APPLICATION FILED NOV. 3, 1915.

1,235,962.

Patented Aug. 7, 1917.
2 SHEETS—SHEET 2.

Inventor.
William L. Dempsey
by Heard Smith & Tennant
Attys.

UNITED STATES PATENT OFFICE.

WILLIAM L. DEMPSEY, OF SOMERVILLE, MASSACHUSETTS.

FIFTH-WHEEL COUPLING FOR WAGONS.

1,235,962.     Specification of Letters Patent.     Patented Aug. 7, 1917.

Application filed November 3, 1915. Serial No. 59,475.

*To all whom it may concern:*

Be it known that I, WILLIAM L. DEMPSEY, a citizen of the United States, and resident of Somerville, county of Middlesex, State of Massachusetts, have invented an Improvement in Fifth-Wheel Couplings for Wagons, of which the following description, in connection with the accompanying drawing, is a specification, like characters on the drawing representing like parts.

This invention relates to improvements in vehicles and particularly to wagons used in the hauling of heavy loads and the principal objects thereof are to provide means for enabling the platform of the wagon to be carried nearer the axle than in the ordinary constructions heretofore made; to provide turning gearing whereby the wagon may be equipped with front wheels more nearly the diameter of the rear wheels than heretofore constructed but adapted to turn within a shorter radius; to provide a coupling between the front axle and the platform which will permit either of the front wheels to ride over obstructions of considerable height without disturbing the transverse level of the platform and without placing any torsional strain upon it, also to provide a construction in which the lashing of the tongue or thills will be substantially avoided.

In the ordinary form of wagon the wagon bed or platform is supported upon a turning bolster which is pivotally connected by the king-bolt to a bolster carried by the front axle. The joint height of these bolsters varies from six to twelve inches, thus necessitating the use of front wheels of much less diameter than the rear wheels in order to maintain the platform level, the smaller front wheels also enabling the wagon to be turned within a circle of shorter radius than could be accomplished if the wheels were of substantially the same diameter.

In low wagons in which drop axles are used the presence of these bolsters results in limiting the drop of the axle rendering necessary a decrease in diameter of both the front and rear wheels in order to lower the platform to the desired level. This decrease in diameter of the wheels results in increasing the draft of the wagon since the smaller wheels do not ride over rough places or obstructions in the ground as readily as larger wheels. The smaller front wheels are also necessitated in low wagons in order to permit the same to be turned within a circle having a reasonably short radius.

By the present invention the necessity of providing a bolster is entirely eliminated and means are provided which permit the turning of the wagon within a circle of much shorter radius than has heretofore been accomplished by wagons provided with small front wheels without unduly narrowing the width of the platform. This is accomplished by providing the front axle with a centrally disposed and rearwardly extending bracket having a swiveled hanger apertured to receive the king-bolt, which preferably is carried directly by the platform. The platform itself is supported directly upon the axle, a fifth wheel or metallic plate, preferably circular in form secured to the under face of the platform resting upon anti-friction members carried by the axle serving to permit the axle to be turned easily in steering the wagon. The swiveled connection of the hanger which receives the king bolt also permits the axle to be tilted vertically without disturbing the level of the platform so that either of the front wheels may ride over relatively large obstructions without rocking the platform, without jolting the load and without causing any material lashing of the tongue or thills.

Other features of the invention will more fully appear from the following description and the accompanying drawings and will be pointed out in the annexed claims.

The drawings illustrate the preferred embodiment of my invention as applied to a low wagon in which in actual construction the front wheels are but two inches less in diameter than the rear wheels and which can be turned within a circle of one half the diameter required for turning the ordinary low wagon of the same size and width of platform.

Figure 1:
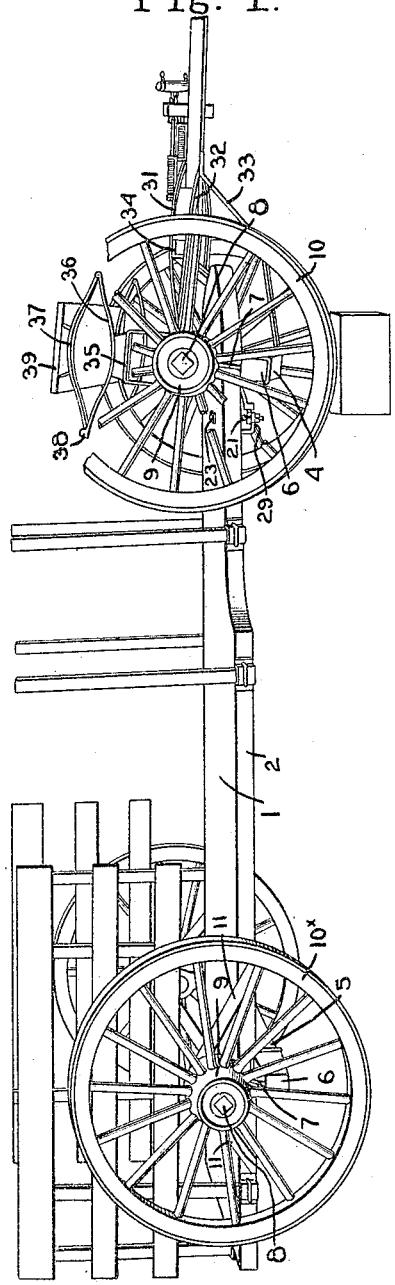
Figure 1 is a perspective view of a low wagon embodying my invention showing one of the front wheels resting upon a pile of blocks, corresponding to an obstruction in the road, while the platform remains level.

The wagon illustrated herein comprises a platform 1 which preferably is constructed with longitudinally extending bed plates 2 preferably of angle iron with transverse plates 3, which may be of iron or of wood, and to which the boards of the platform 1 are secured in the usual manner. The platform is supported upon front and rear drop axles 4 and 5. These axles preferably are of wood and rectangular in cross section the ends of the axles being fitted in thimbles 6 having upwardly extending arms 7 which are provided at their upper ends with outwardly extending skeins 8 to receive the hubs 9 of the wheels 10 and 10ˣ. The front and rear wheels may be of nearly the same diameter when mounted upon like drop axles, the only difference in the diameter of the wheels being that necessitated for the interposition between the platform and the axle of the turning mechanism which will hereinafter be described, which requires a space of approximately two inches.

By using rectangular axles seated in thimbles carried by brackets depending from the skeins upon which the wheels are mounted very strong axles may be utilized as the size of the axles may be varied to suit the load conditions under which the wagon is operated by merely making the thimbles larger or smaller as desired. In wagons in which metallic axles are used the constant loading and unloading gradually causes the axle to bend and this results in spreading the wheels outwardly at their points of contact with the ground and of destroying the proper pitch and gather of the wheels so that they will run hard and cramp upon the axle. By the use of wooden axles this is avoided since the wood will not lose its resilience and will always return to its normal position upon the removal of the load.

In the ordinary forms of wagon the front and rear axles are connected by a reach which is rigidly secured to the center of the rear axle and is provided with hounds extending from a point upon the reach at a considerable distance from the axle to seats in the bolster and on the axle near the ends of the skeins, the reach being pivotally secured to the front axle by the king bolt which passes through the bolsters and axle. The turning gear comprises a fifth wheel which is in the nature of a substantially V-shaped forwardly extending frame secured between the bolster and axle and at its divergent rear ends connected by a curved plate comprising a portion of the circumference of a circle of which the king bolt is the center. This metallic plate is adapted to engage a metallic plate secured to the under surface of the reach. The platform or bed of the wagon is supported upon a turning bolster which is pivotally connected by the king bolt to the bolster upon the front axle and the rear axle of the wagon is provided with a bolster of sufficient height to maintain the wagon platform level.

In the present invention the necessity of a reach with the complicated turning gear and bolsters above described is avoided, the front and rear axles being connected directly by the platform of the wagon itself. In the drop axle wagon illustrated herein the platform 1 is secured near its rear end directly to the rear axle, and the rigidity of the connection may conveniently be strengthened by providing a strap 11 secured at its ends to the sides 2 of the platform and extending over the upper end of the axle arm 7 adjacent the inner end of the skein, the strap being secured to the axle arm in any suitable manner as by a lug or screw. Near its front end the under side of the platform is provided with a circular plate or fifth wheel 12 which is secured by bolts 13 to the transverse girders 3 of the body of the platform. This circular plate rests directly upon antifriction rollers carried by U-shaped brackets 15 which are located directly above the front axle 4, the brackets 15 preferably being secured to or made integral with converging metallic arms 16, 17 and 18 which are united at their converging ends by an enlarged transverse portion 18ˣ to form a bracket for a king bolt hanger. The height of the superimposed arms 16, the brackets 15, the antifriction roller 14 and the circular plate 12 in this construction is approximately two inches so that a difference of two inches in diameter of the front and rear wheels is sufficient to compensate for the space occupied by the turning gear. The third arm 18 of the bracket preferably extends downwardly and is secured to the under side of the front axle. The bracket is provided at the junction of the arms with a horizontal aperture 19 which receives the stem 20 of a coupling block having an enlarged head 21 provided with an aperture 22 to receive the king bolt 23, the stem 20 of the coupling block being adjustably retained in the horizontal aperture 19, to form a swivel connection, by a nut 24 which may be secured from rotation by a key, cotter pin, or set nut. By this construction a universal pivotal connection is provided between the king bolt and the axle, and also means for taking up wear.

Figure 2:
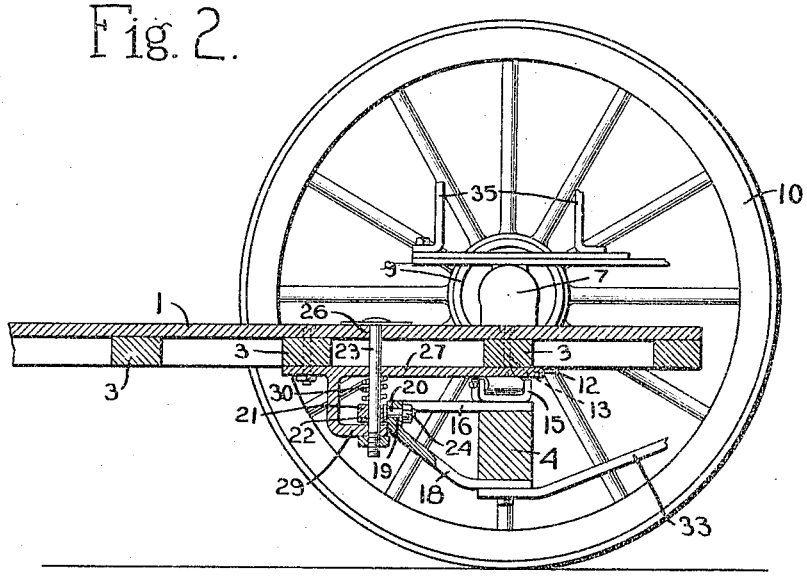
Fig. 2 is a vertical longitudinal sectional view through the platform of a low wagon showing the front wheel and axle and a turning mechanism embodying the preferred form of my invention.
Figure 3:
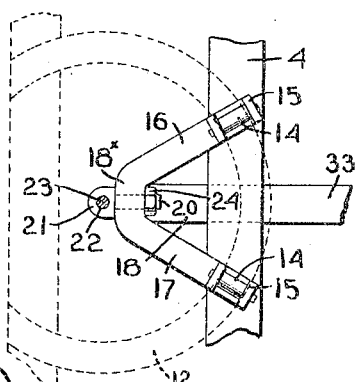
Fig. 3 is a detail view of the fifth wheel construction showing in full lines the bracket which extends rearwardly from the front axle and the hanger which receives the king bolt carried by the platform, and in dotted lines the fifth wheel which is carried by the platform.
Figure 4:
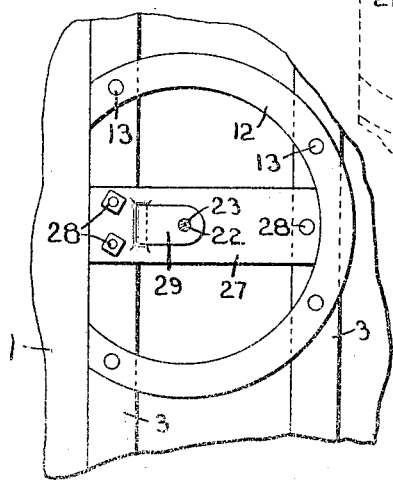
Fig. 4 is a detail underneath plan view of a portion of the platform showing the fifth wheel attached directly thereto.

The king bolt desirably is carried directly by the platform, passing through an aperture 26 in a plate upon the platform and thence through a bracket which is secured to the transverse girders 3 of the platform. This bracket, which is illustrated in Figs. 2 and 4, preferably comprises a plate 27 which is secured to the girders 3—3 by bolts 28 and has an integral downwardly and forwardly extending member 29, the plate 27 and forwardly extending member being apertured in alinement with the aperture 26 in the platform body to receive the king bolt 23, the king bolt passing through the coupling block 21 intermediate of the plate 27 and the forward extension 29.

A spring 30 may be interposed between the hanger 21 and the plate 27 to maintain the coupling block normally in engagement with the extension 29 of the bracket. By this construction a flexibility of movement between the axle and the platform is obtained which will permit either of the front wheels to ride over obstructions in the road without tilting the platform transversely since the swivel connection between the coupling block and its supporting bracket, which extends rearwardly from the axle 4, is adapted to permit a pivotal movement so that the platform will be carried horizontally upon the roller most nearly the wheel which is raised by an obstruction, the level of the platform in the meantime being maintained by its rigid construction and connection to the rear axle, the spring 30 in such case provides a yielding means to permit the tilting of the axle and also serves to absorb the shock or jolt and to prevent the lashing of the tongue which is secured directly to members carried by the front axle.

It will be observed that the wheels in turning move about the axis of the king bolt which is at a considerable distance to the rear of the vertical plane of the axis of the axle, the platform being of such proportion as to permit the wheels to travel around the ends of the platform without engagement therewith. By this construction the wagon may be turned within a radius of approximately one half the diameter of the ordinary low wagon of the same platform and wheel dimensions.

The draft mechanisms preferably comprise draft members in the form of parallel arched plates 31—32 secured directly to the top of the axle arms 7 adjacent the skeins. Desirably a brace 33 extends downwardly and rearwardly from these circular plates to the bottom of the center of the axle, the tongue thereby being supported rigidly upon the front axle of the wagon. The rear end of the tongue desirably passes between and is secured to the arched plates 31, 32, its end being seated in a transverse strut 34 which is secured at its ends between the arched draft plates 31, 32.

A bracket 35, supporting the lower leaf 36 of a seat spring desirably may be secured upon the draft members directly over the axle and the upper leaf spring may be pivotally mounted at its front end upon the lower spring and engage at its rear end guides 38 carried at the rear end of the lower spring so that the seat 39 will be supported directly upon and above the axle arms. The driver may therefore sit directly in alinement with the tongue at all times and thus be enabled to guide his team more effectively than when in the ordinary position, in which the tongue assumes various angles relatively to the seat as the wagon is being turned. This mounting of the seat furthermore, provides a very convenient means for removing the seat when the wagon is to be loaded since the seat may be moved about its forward pivot to be bottom up upon the rear portion of the tongue, thus permitting access to the entire platform.

If desired a suitable braking mechanism may also be mounted directly upon the draft members 31, 32 and may be operated either by a suitable hand lever or by a foot rod extending across the draft gearing in easy reach of the foot of the driver.

It is to be understood that while my invention is illustrated herein as applied to a drop axle wagon that the same may be utilized in wagons of other types and that the novel features of the invention may be embodied in various other forms within the meaning and scope of the following claims.

Having thus described my invention what I claim as new and desire to secure by Letters Patent is;

1. Turning gearing for vehicles having a platform supported from an axle carried by a pair of wheels comprising a universal pivotal connection between said platform and said axle at a distance from the vertical plane of the axis of said axle and coöperating antifriction members upon said platform and axle adapted to permit vertical tilting of the axle without disturbing the level of the platform.

2. Turning gearing for vehicles having a platform supported from an axle carried by a pair of wheels comprising a universal pivotal connection between said platform and said axle at a distance from the vertical plane of the axis of said axle and at a distance below the platform, a bearing plate upon the under surface of said platform, and bearing members upon said axle independently engaging said bearing plate whereby vertical movement of the axle is permitted without disturbing the transverse level of the platform.

3. Turning gearing for vehicles having a platform supported from an axle carried by a pair of wheels comprising a universal pivotal connection between said platform and said axle at a distance from the vertical plane of the axis of said axle and at a distance below the platform, a bearing plate upon the under surface of said platform, cylindrical antifriction bearing members journaled in bearings directly above said axle and having their axes disposed in radial planes in respect to said pivot engaging said bearing plate and symmetrically disposed in respect to the vertical longitudinal central plane of the wagon whereby vertical movement of the axle is permitted without disturbing the transverse level of the platform.

4. In a wagon comprising a platform supported upon the axles of pairs of wheels, turning gearing including a plate secured directly to the under surface of the bed of the platform, a bracket having rearwardly extending radially converging arms secured to the front axle, an apertured coupling block adapted to receive a king-bolt swiveled at the junction of said arms and so disposed that the center of the aperture corresponds to the radial center of said bracket arms, cylindrical antifriction members journaled directly above said axle in bearings in radial alinement with said king bolt aperture engaging said plate and a king bolt carried directly by said platform engaging the aperture in said swiveled coupling block.

5. In a wagon comprising a platform supported upon the axles of pairs of wheels, turning gearing including a bracket having rearwardly extending radially converging arms secured to the front axle, an apertured coupling block adapted to receive a king bolt swiveled at the junction of said arms and so disposed that the center of the aperture corresponds to the radial center of said bracket arms, cylindrical antifriction members journaled directly above said axle in bearings in radial alinement with said king bolt aperture, engaging said plate, a bracket secured to the bed of said platform adapted to receive a king-bolt, a king bolt mounted in said bracket and passing through said swiveled hanger.

6. In a wagon comprising a platform supported upon the axles of pairs of wheels, turning gearing including a bracket having rearwardly extending radially converging arms secured to the front axle, an apertured coupling block adapted to receive a king bolt swiveled at the junction of said arms and so disposed that the center of the aperture corresponds to the radial center of said bracket arms, cylindrical antifriction members, journaled directly above said axle in bearings in radial alinement with said king bolt aperture, engaging said plate, a bracket comprising a plate secured to the under surface of the bed of said platform and having a forwardly extending depending arm, alined apertures in said bracket plate and forward extensions, a king bolt passing through said apertures and the aperture in the swivel coupling block and a spring interposed between said bracket plate and said coupling block adapted normally to retain the coupling block in engagement with the depending arm of said bracket but adapted to permit vertical movement of the axle when obstructions are encountered by either front wheel and absorb shocks which otherwise would be transmitted to the draft mechanism.

7. Turning gearing for vehicles having a platform supported from an axle carried by a pair of wheels comprising a pivotal connection between said platform and said axle at a distance from the vertical plane of the axis of said axle and coöperating antifriction members upon said platform and axle, and means for adjusting said pivotal connection longitudinally of the platform to compensate for wear.

8. In a wagon comprising a platform supported upon the axles of pairs of wheels, turning gearing comprising a bracket having a depending arm secured to said platform, a king bolt mounted in said bracket, a coupling block pivotally mounted upon said king bolt within said bracket, means secured at the front axle connected by a swivel to said coupling block and antifriction members carried by the front axle supporting said platform whereby tilting of the axle is permitted without disturbing the transverse level of the platform.

9. In a wagon comprising a platform supported upon the axles of pairs of wheels, turning gearing comprising a bracket having a depending arm secured to said platform, a king bolt mounted in said bracket, a coupling block pivotally mounted upon said king bolt within said bracket, means secured at the front axle connected by a swivel to said coupling block, antifriction members carried by the front axle supporting said platform whereby tilting of the axle is permitted without disturbing the transverse level of the platform and resilient means adapted yieldably to maintain the coupling block in a predetermined position but adapted to yield to permit tilting of the axle when obstructions are encountered by either front wheel.

10. In a wagon comprising a platform supported upon the axles of a pair of wheels, turning gearing comprising a bracket having a depending arm secured to said platform, a king bolt mounted in said bracket, a coupling block pivotally mounted in said bolt, a helical spring encircling said bracket and adapted normally to maintain the coupling block in contact with the depending arm, a rearwardly extending bracket secured to the front axle connected by a swivel to said coupling block and antifriction rollers mounted in journals upon said axle supporting said platform whereby tilting of the axle is permitted without disturbing the transverse level of the platform.

In testimony whereof, I have signed my name to this specification.

WILLIAM L. DEMPSEY.

Copies of this patent may be obtained for five cents each, by addressing the "Commissioner of Patents, Washington, D. C."